United States Patent [19]

Reschak

[11] 3,927,307

[45] Dec. 16, 1975

[54] POWER AVAILABLE INDICATOR

[75] Inventor: Robert J. Reschak, Hurst, Tex.

[73] Assignee: Textron Inc., Providence, R.I.

[22] Filed: Mar. 1, 1974

[21] Appl. No.: 447,072

[52] U.S. Cl. .......... 235/151.3; 73/117.4; 235/150.2
[51] Int. Cl.² .......................................... G06G 7/70
[58] Field of Search.......... 235/150.2, 150.21, 151.3;
340/27 R; 73/117.4, 133 R, 136 R, 178 R,
178 H; 60/39.16 R, 39.28 R, 39.28 P

[56] References Cited
UNITED STATES PATENTS

| | | | |
|---|---|---|---|
| 3,238,768 | 3/1966 | Richardson | 235/150.2 X |
| 3,272,004 | 9/1966 | Haverl | 235/150.2 X |
| 3,538,760 | 11/1970 | Atkey et al. | 73/117.4 |
| 3,697,731 | 10/1972 | Kempema et al. | 235/150.21 X |
| 3,754,440 | 8/1973 | Edgerton et al. | 235/150.2 X |
| 3,761,693 | 9/1973 | Fleury | 235/151.3 |
| 3,772,880 | 11/1973 | Kubota et al. | 60/39.28 R X |

Primary Examiner—Malcolm A. Morrison
Assistant Examiner—Jerry Smith
Attorney, Agent, or Firm—Richards, Harris & Medlock

[57] ABSTRACT

A method and system for generating and displaying in flight a signal representative of the maximum power available from an aircraft turbine engine. Compressor inlet temperature and pressure, and output shaft speed are measured engine parameters employed to generate the desired signal.

6 Claims, 6 Drawing Figures

POWER AVAILABLE INDICATOR

FIELD OF THE INVENTION

This invention relates to a method of generating during flight a signal representing the maximum horsepower available from a turbine engine, and more particularly, in one aspect, relates to the production of a status signal or visual display dependent upon available shaft horsepower.

THE PRIOR ART

Heretofore, aircraft engine performance capabilities were predicted through theoretical studies based upon wind tunnel and similar ground tests. Actual power available could only be determined by trial and error in flight. With the present invention, a pilot or an automatic system is continually informed of engine power availability while in flight, and can better utilize aircraft capabilities to safely enter operations in marginal power-available conditions.

SUMMARY OF THE INVENTION

The present invention is directed to the in flight generation of a maximum power available signal from an aircraft turbine engine. Engine performance parameters at a fixed operating point are manually set into the system. Compressor inlet temperature and pressure, and output shaft speed comprise three engine parameters which must be continually sensed and measured during flight to generate the desired signal. Thus a detailed knowledge of the engine performance is not required to completely define the engine power available under any condition in the engine's operating envelope.

The system is based upon partial derivative equations derived from dimensional analysis of turbine engine performance. With this system the pilot is continually informed of engine power availability to operate in marginal power conditions. The power available signal can be displayed to the pilot, or used as an engine power status input to other onboard systems to prevent them from demanding more power than is available.

More particularly, real-time inflight generation of the shaft horsepower available signal at optimum shaft speed, the loss in horsepower resulting from operating at a speed other than the optimum operating speed, and the available shaft horsepower are continuously generated in response to the measured engine compressor inlet temperature and pressure, and output shaft speed.

In a further aspect, the available shaft horsepower signal is converted to a format suitable for real time display to the pilot, or transmitted as a status input to other onboard flight systems for safe operation under marginal power conditions.

For a more complete understanding of the present invention and for further objects and advantages thereof, reference may now be had to the following description taken in conjunction with the accompanying drawings in which.

Figure 1:
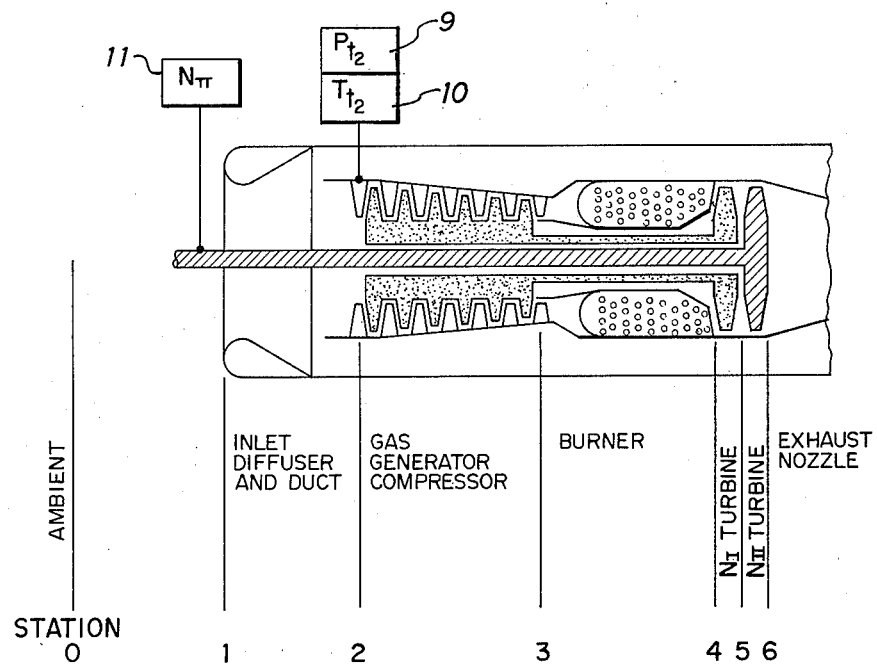
FIG. 1 is a sectional view of a turbine engine.

In the following description, P and T represent the absolute pressure and temperature, respectively. The subscript "$t$" represents total temperature or total pressure. The subscript "SL" represents sea level standard day atmospheric condition. The numeral subscript represents the various engine stations as shown in FIG. 1. N represents the output shaft speed, and SHP represents the shaft horsepower. Other definitions will be given as the description progresses.

Turbine engine power ratings are usually defined as the power at a specific turbine inlet temperature ($T_{t_5}$). Although the actual shaft horsepower available may vary with altitude and temperature, the value of $T_{t_5}$ remains constant for each power rating. From dimensional analysis of turbine engine performance, a singular relationship between output shaft horsepower and $T_{t_5}$ can be developed. From this relation the effects of pressure and temperature on the power available can be determined.

From dimensional analysis, $$\frac{SHP}{\delta_{t_2}\sqrt{\theta_{t_2}}} = f\left[\frac{T_{t_5}}{\theta_{t_2}}\right],$$

where $\delta_{t_2}$ represents the ratio of the pressure measured at the compressor inlet at station 2 to the pressure at sea level on a standard day, and $\theta_{t_2}$ represents the ratio of the temperature measured at the compressor inlet at station 2 to the temperature at sea level on a standard day.

Figure 4:
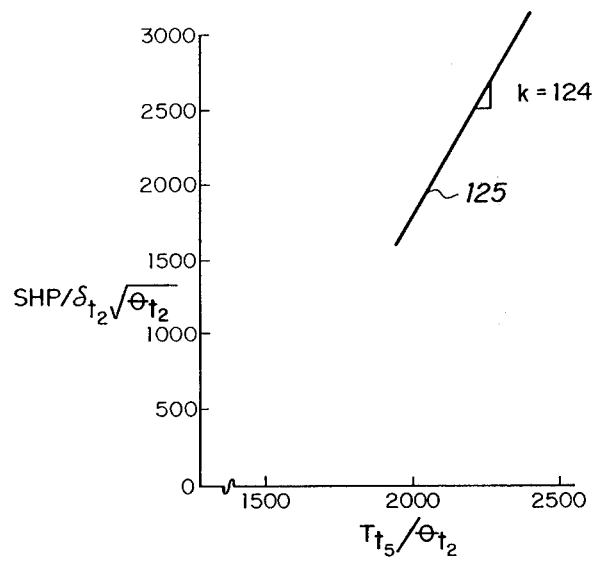
FIG. 4 is a graph depicting $T_{t_5}/\theta_{t_2}$ as a function of $SHP/\delta_{t_2}\sqrt{\theta_{t_2}}$.

When $SHP/\delta_{t_2}\sqrt{\theta_{t_2}}$ is plotted vs. $T_{t_5}/\theta_{t_2}$ the curve is approximately linear over the normal range of variation for a particular power rating as shown in FIG. 4. If the relation between power and turbine inlet temperature is linear then $$\frac{\delta\left[\frac{SHP}{\delta_{t_2}\sqrt{\theta_{t_2}}}\right]}{\delta\left[\frac{T_{t_5}}{\theta_{t_2}}\right]} = KV_T = \text{constant}.$$

$$\frac{\text{constant}}{\sqrt{\theta_{t_2}}} = \text{constant}.$$

Thus, $$\delta\left[\frac{SHP}{\delta_{t_2}\sqrt{\theta_{t_2}}}\right] = P_{SL}\sqrt{T_{SL}}\,\delta\left[\frac{SHP}{P_{t_2}\sqrt{T_{t_2}}}\right] = K\,\delta\left[\frac{T_{t_5}}{\theta_{t_2}}\right].$$

Expanding these derivatives, $$P_{SL}\sqrt{T_{SL}}\,\delta\left[\frac{SHP}{P_{t_2}\sqrt{T_{t_2}}}\right] = P_{SL}\sqrt{T_{SL}}\left[\frac{1}{P_{t_2}\sqrt{T_{t_2}}}\delta(SHP) + SHP\,\delta\left[\frac{1}{P_{t_2}\sqrt{T_{t_2}}}\right]\right]$$

and $$\delta\left[\frac{T_{t_5}}{T_{t_2}/T_{SL}}\right] = T_{t_5}T_{SL}\left[-\frac{\delta T_{t_2}}{T_{t_2}^2}\right] = -\frac{T_{t_5}T_{SL}}{T_{t_2}^2}\delta T_{t_2}.$$

Substituting and solving for $$\frac{\delta(SHP)}{\delta T_{t_2}},$$

$$\frac{\delta(SHP)}{\delta(T_{t_2})} = P_{t_2}\sqrt{T_{t_2}}\left[-\frac{T_{t_5}T_{SL}}{P_{SL}\sqrt{T_{SL}}T_{t_2}^2}K - SHP\frac{\delta\left[\frac{1}{P_{t_2}\sqrt{T_{t_2}}}\right]}{\delta(T_{t_2})}\right].$$

However, $$\frac{\delta\left[\frac{1}{P_{t_2}\sqrt{T_{t_2}}}\right]}{\delta T_{t_2}} = \frac{1}{\sqrt{T_{t_2}}}\frac{\delta\left[\frac{1}{P_{t_2}}\right]}{\delta T_{t_2}} + \frac{1}{P_{t_2}}\frac{\delta\left[\frac{1}{\sqrt{T_{t_2}}}\right]}{\delta T_{t_2}}.$$

But for any arbitrary atmosphere, pressure is independent of temperature. Thus, $$\frac{\delta\left[\frac{1}{P_{t_2}\sqrt{T_{t_2}}}\right]}{\delta T_{t_2}} = -\frac{1}{2P_{t_2}T_{t_2}^{3/2}}.$$

The equation relating the change in power with the change in compressor inlet temperature ($T_t$) reduces to $$\frac{\delta(SHP)}{\delta T_{t_2}} = \frac{1}{2}\frac{SHP}{T_{t_2}} - K\frac{T_{t_5}}{T_{t_2}}\frac{\delta_{t_2}}{\sqrt{\theta_{t_2}}}.$$

A similar method can be used to develop an expression for the change in power with compressor inlet pressure. From the previous development it was shown that $$\frac{SHP}{\delta_{t_2}\sqrt{\theta_{t_2}}} = f\left[\frac{T_{t_5}}{\theta_{t_2}}\right].$$

Then, $$\frac{\delta\left[\frac{SHP}{\delta_{t_2}\sqrt{\theta_{t_2}}}\right]}{\delta P_{t_2}} = 0.$$

Expanding this expression, $$\frac{1}{\sqrt{\theta_{t_2}}}\left[\frac{1}{\delta_{t_2}}\frac{\delta(SHP)}{\delta P_{t_2}} - \frac{P_{SL}}{P_{t_2}^2}SHP\right] = 0.$$

Solving for the partial of power with compressor inlet pressure and simplifying, $$\frac{\delta(SHP)}{\delta P_{t_2}} = \frac{SHP}{P_{t_2}}$$

Combining the expressions for the change in power with compressor inlet temperature and pressure with the engine characteristics at a known reference condition yields the following equation for power available at any other condition, $$SHP@_{\Pi_{OPT}} = SHP_{REF}\frac{P_{t_2}}{P_{t_2REF}}\left[1.5 - \frac{T_{t_2REF}}{2T_{t_2}}\right] - \left[\frac{KT_{t_5REF}}{\theta_{t_2}}\frac{\delta_{t_2}}{\theta_{t_2}}\right]\left[1 - \frac{T_{t_2REF}}{T_{t_2}}\right], \quad (A)$$

where $$K = \frac{\delta\left[\frac{SHP_{REF}}{\delta_{t_2REF}\theta_{t_2REF}}\right]}{\delta\left[\frac{T_{t_2REF}}{\theta_{t_2REF}}\right]} = \text{slope of the curve at the reference condition.}$$

This expression for the change in power assumes that the efficiency of the turbine does not change as the weight rate of airflow through the engine varies with compressor inlet pressure and temperature. In general, as the airflow through the engine varies, the speed of the power turbine must be changed to maintain the best engine efficiency. If the turbine speed is above or below the optimum speed, an additional power loss results.

An expression for this variation in optimum power turbine speed with shaft horsepower can be derived with dimensional analysis. The expression can be stated as $$\frac{N_{\Pi_{OPT}}}{\sqrt{\theta_{t_2}}} = f\left[\frac{SHP}{\delta_{t_2}\sqrt{\theta_{t_2}}}\right]$$

Figure 5:
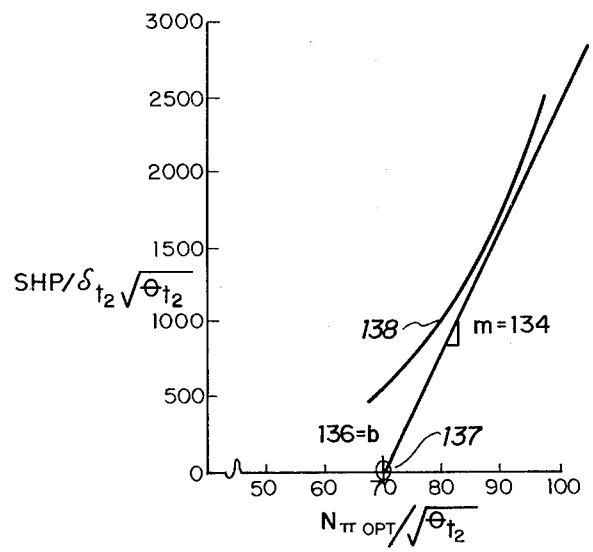
FIG. 5 is a graph depicting $N_{\Pi OPT}/\sqrt{\theta_{t_2}}$ as a function of $SHP/\delta_{t_2}\sqrt{\theta_{t_2}}$.

A typical curve of this function is shown in FIG. 5. The variation of $N_{\Pi_{OPT}}$ with SHP can be assumed linear over the range of power variation normally encountered for a specific power rating. This assumption would simplify the correction for off optimum $N_{\Pi}$ without resulting in any significant error. Thus, $$\frac{N_{\Pi_{OPT}}}{\sqrt{\theta_{t_2}}} = b + \frac{(M)SHP}{\delta_{t_2}\sqrt{\theta_{t_2}}},$$

where the $b$ represents the abscissa intercept of curve 138, and M represents the slope of the curve.

Figure 6:
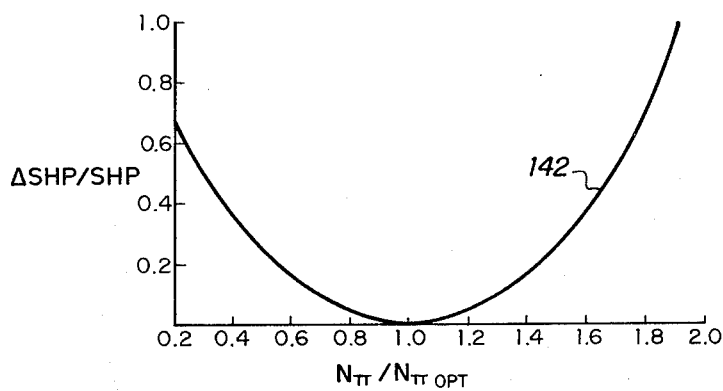
FIG. 6 is a graph depicting $\Delta SHP/SHP$ as a parabolic function of $N_{\Pi/N\Pi OPT}$.

The relationship between the percentage loss in power with off optimum $N_\Pi$ is nearly parabolic, as shown in FIG. 6. This simplifies the expression for $\Delta SHP$, the power loss.

Thus, $$\frac{\Delta SHP}{SHP} = a \left( \frac{N\Pi}{N\Pi_{OPT}} - 1 \right)^2 \quad (B)$$

where the a represents the inverse of the latus rectum. The previously developed equation for $SHP_{@N \Pi_{OPT}}$, Equation (A), may be substituted in the following equation to give the complete expression for power available. Thus, $$SHP_{AVAILABLE @ N_\Pi} = SHP_{@N\Pi_{OPT}} + \Delta SHP . \quad (C)$$

FIG. 1

FIG. 1 illustrates a turbine engine wherein the numerals 0–5 represent the free stream, inlet duct, compressor inlet, compressor outlet, gas generator turbine inlet, and power turbine inlet stations, respectively.

The signal generator of the present invention requires inputs from sensor 9 and sensor 10 placed at station 2 to measure absolute pressure, $P_{t_2}$, and absolute temperature, $T_{t_2}$, respectively. Also required is a sensor 11 to measure the output shaft speed, $N_\Pi$.

Figure 2:
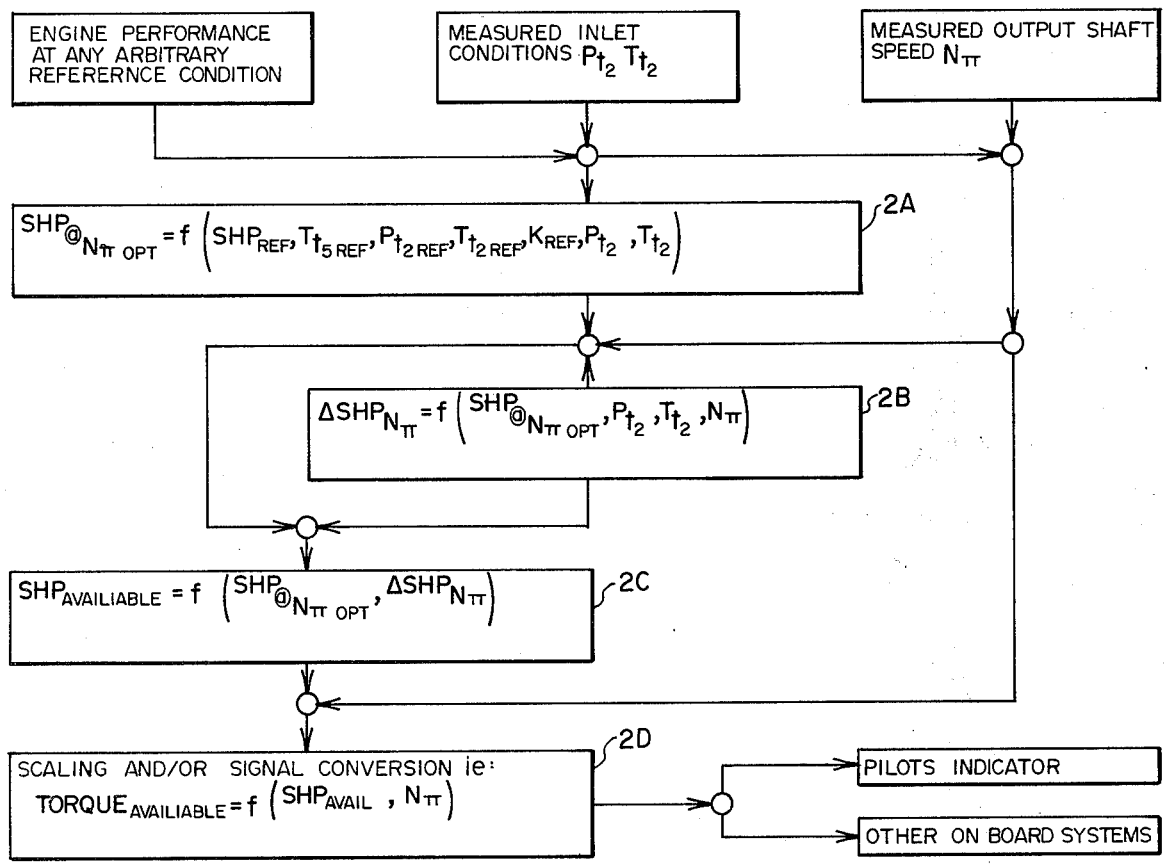
FIG. 2 is a functional block diagram of a single signal generation cycle of the onboard generator.

A functional block diagram of a generation cycle of an analog system is shown in FIG. 2, wherein the analog unit has three principal stages shown as 2A, 2B, and 2C. The inputs to the system include engine performance parameters at an arbitrary reference condition. Such values are introduced as constants and are taken from norm values for each given engine. Table I provides performance rating parameters for an engine made by Allison, a General Motors subsidiary, and identified as the C20.

modification of the various signals involved is represented by the aforementioned Equation (A). Stage 2B involves the development of a horsepower correction signal, $\Delta SHP$, represented by previously developed Equation (B), which is necessary to more nearly reflect operations conducted at other than optimum turbine shaft speeds. Stage 2C corrects the output of stage 2A to produce a signal representing the available shaft horsepower at the operating shaft speeds, as represented by Equation (C). Stage 2D then provides for the conversion of the available horsepower signal into a format suitable for display to the pilot, or the transmittal of the signal to other onboard systems.

Figure 3:
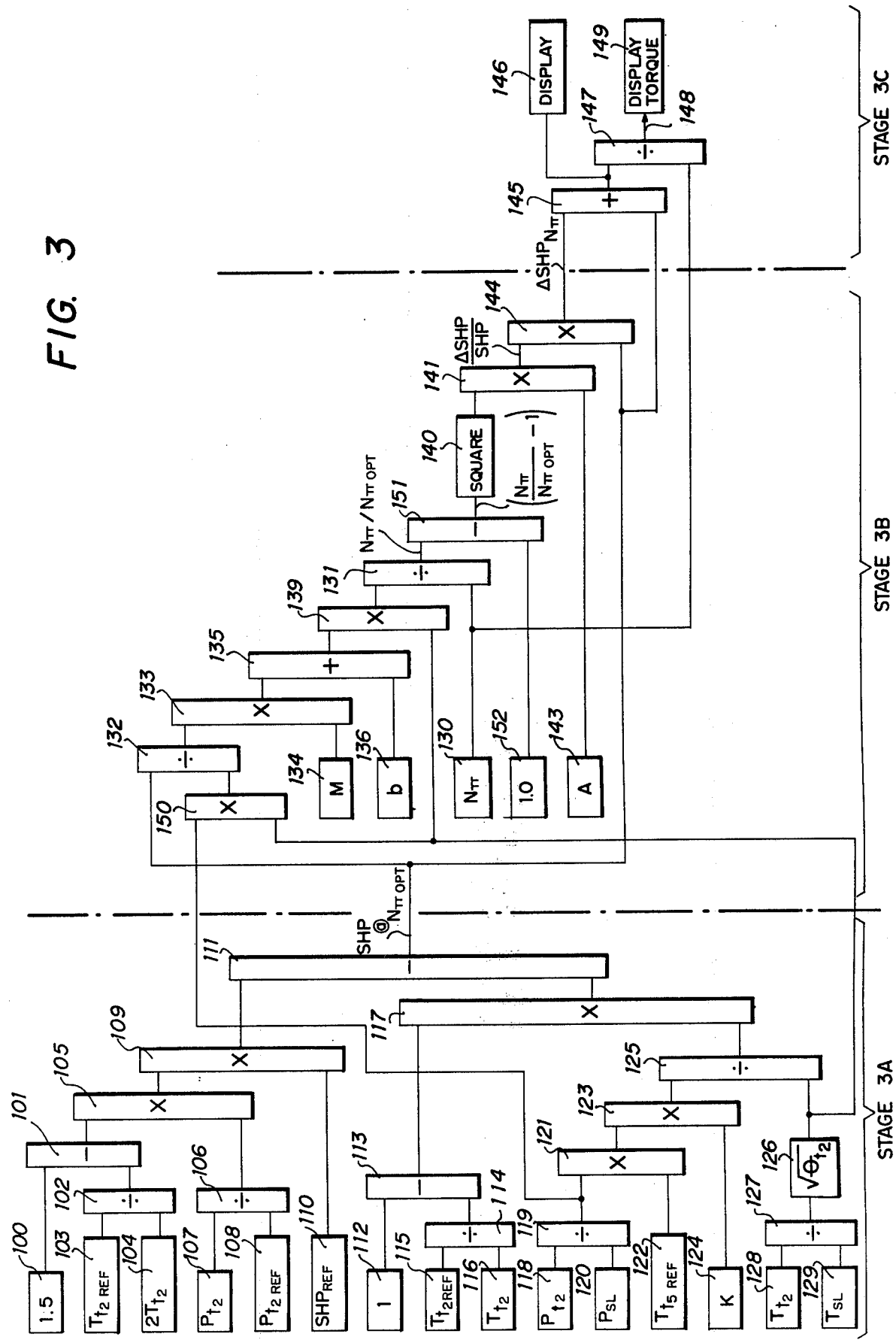
FIG. 3 is an illustration of an analog system for generating the signal of FIG. 2.

In FIG. 3 the system has been illustrated in its logical stages. More particularly, the first stage, 3A, includes a constant source 100 connected to a subtraction unit 101. The second subtraction input is supplied by the output of the divider 102 whose inputs are supplied by sources 103 and 104. The source 103 is a manually preset input representing the absolute temperature at the atmospheric conditions as specified in Table I. It will be recognized that Table I might be specified in terms of conditions other than at standard sea level. However, for the present example it will be assumed that standard sea level conditions are to be employed. Thus, the standard sea level temperature represented by the inputs of the unit 103 would be 519° Rankine which represents 15° C. or 59° F.

The source 104 represents the measured value of the compressor input temperature at station 2 as measured by sensor 10, FIG. 1.

The output of the subtraction unit 101 is supplied to a multiplier 105. The second input to multiplier 105 is supplied from a dividing unit 106, the input of which is supplied by unit 107 and manually preset input 108. The signal represented by the source 107 is the pressure measured at the compressor inlet, station 2 of the engine, by sensor 9, FIG. 1.

The voltage represented by the output of unit 108 is

TABLE I

PERFORMANCE RATINGS
STANDARD SEA LEVEL STATIC CONDITIONS

| Rating | (i) Equiv. Shaft HP (est) | Shaft HP (min) | Jet Thrust lb (est) | Prop Shaft rpm | Gas Producer rpm (est) | (ii) Measured Rated Gas Temp. °F |
|---|---|---|---|---|---|---|
| Takeoff | 330 | 317 | 33 | 2370 | 51600 | 1380 |
| Max. Cont. | 281 | 270 | 28 | 2370 | 49760 | 1280 |
| Cruise A | 253 | 243 | 26 | 2135 | 48800 | 1241 |
| Cruise B | 212 | 203 | 22 | 2015 | 47120 | 1165 |
| Idle | 37 | 35 est | 5 | — | 32000 | 850 ± 100 |

The parameters of Table I were obtained under standard sea level static conditions. Each engine is accompanied by a table, such as Table I, that represents guaranteed minimum performance values. Note that in Table I the performance ratings are set out in terms of Takeoff, Maximum Continuous Operation, Cruise A, Cruise B, and Idle conditions. The values employed by the analog system from Table I are (i) the shaft horsepower and (ii) the measured rated gas temperature for the particular power rating of interest. Additional required inputs are the aforementioned measured conditions $P_{t_2}$, $T_{t_2}$ and $N_\Pi$.

In FIG. 2, it will be noted that the first stage 2A of the system produces an output which represents the shaft horsepower at the optimum output shaft speed. The the absolute pressure measured at the compressor inlet, station 2, for the atmospheric conditions of Table I, or 29.92 inches of mercury.

The output of multiplier 105 is connected to a multiplier 109. The second input of multiplier 109 is supplied from manually preset input unit 110. This is a constant value represented by the selected value from Table I. Assume for the purpose of the present example that the pilot is interested in knowing the maximum power available for take-off. In such case, the output of unit 110 would be properly scaled to reflect the value of 317 shaft horsepower minimum, as reflected by Table I.

The output of multiplier 109 is connected to a subtraction unit 111. Thus, the first input to the unit 111 represents the solution to the first half or first member of the Equation (A). The second member of Equation (A) supplies second inputs to subtraction unit 111. More particularly, a constant supply source 112 is connected to an input of a subtraction unit 113. The second input of unit 113 is supplied from a dividing unit 114 whose inputs are supplied by units 115 anad 116. Unit 115 is a manually preset unit which represents the absolute temperature under Table I atmospheric conditions, or 519° Rankine. This thus represents the same value as the output of unit 103. The output of unit 116 represents one-half the output of unit 104.

The output of subtraction unit 113 is supplied to one input of a multiplier 117. Thus, the first input to unit 117 is represented by the parenthetical expression of the second member of Equation (A). The bracketed portion or first element of the second member of Equation (A) supplies the second input to multiplier 117. More particularly, a unit 118 is connected to a divider 119, the second input of which is supplied from a unit 120. The unit 118 supplies the same signal as unit 107. The unit 120 supplies a signal representative of the pressure at sea level at a standard day, this is the sea level pressure regardless of the conditions set by Table I. It will be remembered that Table I may be set out in terms other than standard sea level conditions. Regardless of Table I, the signal from unit 120 represents the standard pressure at sea level. The output of dividing unit 119 is the ratio of the pressures, and in Equation (A) is represented by the notation $\delta_{t_2}$. This ratio is then applied to a multiplier 121, the second input of which is supplied from a manually preset unit 122. The unit 122 is the temperature taken from Table I for the take-off operations, which is noted to be 1380° F. Converted to Rankine, this would be 1840° Rankine.

The output of multiplier 121 is connected to a second multiplier 123. The second input of multiplier 123 is supplied from the manually preset unit 124, which is a constant. This constant represents the slope of the curve shown in FIG. 4 at a reference operating point. FIG. 4 depicts a curve which is a function of the ratio of temperature at the input to the power turbine divided by the ratio of the temperature to the compressor input at station 2 divided by the absolute temperature at sea level standard day. Thus, FIG. 4 plots that ratio against the ratio of available shaft horsepower divided by the product of $\delta_{t_2}$, as appearing at the output of unit 119, multiplied by the square root of $\theta_{t_2}$, as appearing at the output of unit 126. Such turbine inlet temperature relationships generally are known and available for each engine, and are roughly comparable for a wide range of engines. Thus, a graph such as FIG. 4 can be derived directly from the data set forth in the shaft horsepower and the measured rated gas temperature columns of Table I.

The output of multiplier 123 is supplied to a divider 125, the second input of which is supplied from the output of a square root unit 126, whose input is supplied from a divider 127, whose inputs are supplied from units 128 and 129. The unit 128 is a measured value of temperature at the compressor inlet station 2. The value of temperature in unit 129 is the temperature of a sea level standard day and is thus constrained the same as the output of unit 120.

The output of unit 125 then supplies the second input to multiplier 117. The output of unit 117 is applied to the input of subtraction unit 111. The output of unit 117 represents the second half or member of Equation (A). The output of unit 111 thus represents the shaft horsepower available at optimum operating shaft speed.

The second stage of the calculator, 3B, has as an input the output of unit 130, which is actual shaft speed as measured by sensor 11, FIG. 1. This signal is then applied to a dividing unit 131. The second input of unit 131 is supplied from units which include a dividing unit 132. One input of dividing unit 132 is the output of section 111. A second input is supplied by multiplier 150, the two inputs of which are supplied by outputs of units 126 and 119. The output of divider 132 is supplied to a multiplier 133. The second input of multiplier 133 is supplied from a unit 134. The magnitude of the signal from unit 134 represents the slope of the curve of FIG. 5 taken at the particular output shaft speed taken from Table I.

FIG. 5 represents the relationship between $SHP/\delta_{t_2} \sqrt{\theta_{t_2}}$ and $$\frac{N_{\Pi OPT}}{\sqrt{\theta_{t_2}}}$$

for a particular engine, and thus is a constant at a particular shaft horsepower. The value of unit 134 is then applied to multiplier 133, whose output is supplied to a summation unit 135. The second input to the unit 135 is the constant speed from source 136 which represents point 137, the zero intercept of the slope of curve 138 of FIG. 5 for the particular value of M used in unit 134. The output of unit 135 is supplied to a multiplier unit 139, the second input of which is supplied from unit 126. The output of unit 139 is then connected to the second input of the divider 131. The output of the unit 131 represents the ratio of the actual shaft speed to the optimum shaft speed. The output of unit 131 is then applied to subtraction unit 151, the second input of which is a constant supply source unit 152. The output of unit 151 is applied to a square unit 140, the output of which is applied to a multiplier 141. Operation in unit 141 is then made dependent upon the curve 142 of FIG. 6. Heretofore, in-flight prediction of aircraft performance capability was accomplished by determining engine power available either through interpolation of graphical and tabular data, or by trial and error.

FIG. 6 is a graph of the ratio of the actual operating speed to the optimum operating speed as a function of the shaft horsepower loss divided by the optimum shaft horsepower. Curve 142 is a parabolic curve for a given engine and its performance. The curve is defined by the expression $Y=AX^2$. The constant A then is a given factor for any given engine. The input from unit 143 to unit 141 represents the constant A. The output of multiplier 141 is then applied to multiplier 144, the second input of which is supplied from unit 111. The output of multiplier 144 is then the loss in horsepower resulting from operating at a speed other than the optimum operating speed.

In stage 3C the output of units 111 and 144 are summed into unit 145. This then represents the available shaft horsepower and may be applied to a display unit 146. Alternatively, if a torque output display is desired, then the output of unit 145 may be applied as one input to the divider 147 with the output of unit 130 applied to the other input of divider 147. Line 148 then provides a torque signal which may be applied to display unit 149.

In accordance with the invention, there is provided a method of indicating power available from an aircraft turbine engine. More particularly, the total absolute pressure and temperature at the compressor inlet is measured, as is the speed of the output shaft of the engine, and a signal representative of the power available is continuously generated and displayed during flight in response to the measured engine values.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for calculating while in flight the maximum power available from an aircraft turbine engine, which comprises:
   a. sensors for generating signals continuously representative of the compressor inlet temperature, the compressor inlet pressure and the output shaft speed of the engine;
   b. a storage means for engine performance reference signals including only standard day sea level pressure and temperature, shaft horsepower at standard sea level static conditions for a particular engine power rating, and controlled turbine inlet gas temperature;
   c. means responsive to said reference signals and said signals from said sensors to generate an output signal representing available power; and
   d. means for displaying said output signal.

2. The combination as set forth in claim 1, wherein said storage means includes a manually set potentiometer connected to a voltage source.

3. In a method for signaling in flight the maximum power available from a turbine engine where compressor inlet temperature and pressure and output shaft speed are continuously sensed, which comprises:
   a. manually storing engine performance parameters including turbine inlet temperature controlled for a particular reference condition;
   b. generating a shaft horsepower available signal for optimum operating shaft speed as a function of said sensed compressor inlet temperature and pressure and said reference data;
   c. generating a loss in shaft horsepower signal, resulting from operating at a shaft speed other than optimum operating speed, as a function of sensed data including said output shaft speed and said optimum shaft horsepower;
   d. combining said optimum shaft horsepower available and loss in shaft horsepower signals to obtain a signal representing said available shaft horsepower; and
   e. converting said available shaft horsepower signal into format for display to the pilot.

4. The method of indicating power available from a helicopter turbine engine, comprising:
   a. continuously measuring the total pressure and total temperature at the compressor intake of said engine;
   b. generating a shaft horsepower available signal for optimum operating shaft speed based on said measured compressor intake total pressure and temperature;
   c. continuously measuring the speed of the output shaft of said engine;
   d. generating a loss in shaft horsepower signal corresponding to operating of said shaft at a speed other than optimum operating speed, said loss in horsepower signal being based on said measured compressor intake total pressure and temperature and output shaft speed; and
   e. combining the optimum shaft horsepower available signal and loss in shaft horsepower signal to compute a signal representative of the power available.

5. In a system for predicting the performance capabilities of an aircraft turbine engine under marginal power available conditions, the combination which comprises:
   a. a plurality of inflight sensors for measuring the engine compressor inlet temperature, the compressor inlet pressure and the output shaft speed of the engine;
   b. a means for storing reference quantities representative of engine performance reference data including a rated turbine inlet temperature;
   c. a generator for generating during flight from said sensed parameters and said reference quantities a signal representing said available power; and
   d. means for utilizing said available power signal, said generator including
      i. means for producing a shaft horsepower available signal at optimum operating shaft speed, said horsepower available signal being based on stored engine performance reference quantities including a rated turbine inlet temperature and engine compressor inlet temperature and pressure,
      ii. means for producing a loss in shaft horsepower signal corresponding to operation at other than optimum shaft speed, said loss in horsepower signal being based on engine performance reference quantities and the inflight sensed parameters, and
      iii. means for combining the optimum shaft horsepower available signal with the loss in horsepower signal to generate an available shaft horsepower signal.

6. In an aircraft information system where a turbine inlet pressure and temperature and turbine output shaft speed are sensed to produce electrical signals proportional thereto, the combination comprising:
   a. means to store a constant electrical signal applicable to a given model of turbine and proportional to the specified controlled temperature at the turbine inlet;
   b. means to store electrical signals proportional to engine rated horsepower at sea level for said model operating in a particular engine operating mode;
   c. means to store signals proportional to standard temperature and pressure at sea level, and
   d. means to generate from said signals an output signal representative of power available from said turbine at the sensed temperature and pressure.

* * * * *

UNITED STATES PATENT OFFICE
CERTIFICATE OF CORRECTION

Patent No. 3,927,307  Dated Dec. 16, 1975

Inventor(s) Robert J. Reschak

It is certified that error appears in the above-identified patent and that said Letters Patent are hereby corrected as shown below:

Col. 2, line 10, "$N_{\Pi OPT}/\sqrt{\theta_{t_2}}$" should be -- $N_{\Pi_{OPT}}/\sqrt{\theta_{t_2}}$ --;

line 13, "$N_{\Pi/N\Pi OPT}$" should be -- $N_\Pi / N_{\Pi_{OPT}}$ --;

line 35, "$\frac{SHP}{\delta_{t_2}\sqrt{\theta_{t_2}}} = f\left[\frac{T_{t5}}{\theta_{t2}}\right].$" should be -- $\frac{SHP}{\delta_{t_2}\sqrt{\theta_{t_2}}} = f\left(\frac{T_{t_5}}{\theta_{t_2}}\right),$ -- line 50, "$\frac{\delta\left[\frac{SHP}{\delta_{t_2}\sqrt{\theta_{t_2}}}\right]}{\delta\left[\frac{T_{t5}}{\theta_{t2}}\right]}\Bigg|_{\substack{KV_T = constant \\ \sqrt{\theta_{t_2}} = constant}}$" should be -- $\frac{\partial\left(\frac{SHP}{\delta_{t_2}\sqrt{\theta_{t_2}}}\right)}{\partial\left(\frac{T_{t_5}}{\theta_{t_2}}\right)}\Bigg|_{\substack{K = constant \\ \frac{V_T}{\sqrt{\theta_{t_2}}} = constant}}$ --.

Col. 4, line 58, "$N_{\Pi OPT}$" should be -- $N_{\Pi_{OPT}}$ --.

Col. 5, line 12, "$SHP_{@N\Pi OPT}$" should be -- $SHP_{@N_{\Pi_{OPT}}}$ --.

Col. 7, line 7, "anad" should be --and--.

Col. 8, lines 20-25, "$\frac{N_{\Pi OPT}}{\sqrt{\theta_{t_2}}}$" should be -- $\frac{N_{\Pi_{OPT}}}{\sqrt{\theta_t}}$ --.

Signed and Sealed this

Twenty-seventh Day of July 1976

[SEAL]

Attest:

RUTH C. MASON
Attesting Officer

C. MARSHALL DANN
Commissioner of Patents and Trademarks